(12) United States Patent
Iizuka et al.

(10) Patent No.: US 11,047,968 B2
(45) Date of Patent: Jun. 29, 2021

(54) ESTIMATING METHOD AND ESTIMATING DEVICE

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP); Dai Sasakawa, Kanagawa (JP); Nobuyuki Shiraki, Iwate (JP); Kazuki Numazaki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

(21) Appl. No.: 16/711,855

(22) Filed: Dec. 12, 2019

(65) Prior Publication Data

US 2020/0209376 A1 Jul. 2, 2020

(30) Foreign Application Priority Data

Dec. 28, 2018 (JP) .............................. JP2018-248250
Aug. 6, 2019 (JP) .............................. JP2019-144735

(51) Int. Cl.
*G01S 13/06* (2006.01)
*G01S 13/04* (2006.01)
(Continued)

(52) U.S. Cl.
CPC .............. *G01S 13/06* (2013.01); *G01S 13/04* (2013.01); *H04B 13/005* (2013.01);
(Continued)

(58) Field of Classification Search
CPC .......... G01S 7/415; G01S 13/42; G01S 13/06; G01S 13/04; H04L 25/0204;
(Continued)

(56) References Cited

U.S. PATENT DOCUMENTS 10,241,187 B2 3/2019 Honma et al.
2017/0184699 A1* 6/2017 Honma ................. G01S 13/003
(Continued)

FOREIGN PATENT DOCUMENTS

JP 2000-171550 6/2000
JP 2009-281775 12/2009
(Continued)

OTHER PUBLICATIONS

Dai Sasakawa , Naoki Honma, Takeshi Nakayama and Shoichi Iizuka, "Human Identification Using MIMO Array", Iwate University, Panasonic, Apr. 2018 (Year: 2018).*
(Continued)

*Primary Examiner* — Aristocratis Fotakis
(74) *Attorney, Agent, or Firm* — Greenblum & Bernstein, P.L.C.

(57) ABSTRACT

Complex transfer functions indicating characteristics of propagation between transmission antenna elements and N reception antenna elements are calculated from reception signals received by the N reception antenna elements during a predetermined period. Components affected by vital activity are extracted from the calculated complex transfer functions. A correlation matrix is calculated from changed components affected by vital activity. A steering vector for regions divided from a target region is calculated. A living-body signal intensity vector is estimated by performing compressed sensing for an unknown value that is the living-body signal intensity vector using a correlation matrix vector and an extended steering vector. The number of components
(Continued)

constituting the living-body signal intensity vector and having a value of at least a predetermined threshold is estimated to be the number of living bodies, and positions of regions corresponding to the components are estimated to be estimated positions of the living bodies.

4 Claims, 5 Drawing Sheets

(51) Int. Cl.
    *H04L 25/02*         (2006.01)
    *H04B 13/00*         (2006.01)
    *H04B 17/391*       (2015.01)
    *H04B 17/309*       (2015.01)
    *H04B 7/0413*       (2017.01)

(52) U.S. Cl.
    CPC ......... *H04B 17/309* (2015.01); *H04B 17/391* (2015.01); *H04L 25/0204* (2013.01); *H04B 7/0413* (2013.01)

(58) Field of Classification Search
    CPC . H04L 25/021; H04L 25/0242; H04B 17/391; H04B 13/005
    See application file for complete search history.

(56) References Cited

U.S. PATENT DOCUMENTS

| | | | | |
|---|---|---|---|---|
| 2018/0011169 | A1* | 1/2018 | Nakayama | G01S 7/411 |
| 2018/0055437 | A1* | 3/2018 | Nakayama | A61B 5/117 |
| 2019/0175074 | A1* | 6/2019 | Zhang | H04B 17/336 |
| 2019/0195997 | A1* | 6/2019 | Iizuka | G01S 7/411 |
| 2019/0339379 | A1* | 11/2019 | Iizuka | G01S 13/32 |
| 2020/0011988 | A1* | 1/2020 | Nakayama | G01S 13/58 |
| 2020/0191913 | A1* | 6/2020 | Zhang | G01S 7/006 |
| 2020/0300972 | A1* | 9/2020 | Wang | A61B 5/7207 |
| 2020/0302187 | A1* | 9/2020 | Wang | H04B 7/12 |

FOREIGN PATENT DOCUMENTS

| | | |
|---|---|---|
| JP | 2015-117972 | 6/2015 |
| JP | 2019-117055 | 7/2019 |

OTHER PUBLICATIONS

Dai Sasakawa, Keita Konno, Naoki Honma, Kentaro Nishimori, Nobuyasu Takemura, Tsutomu Mitsui and Yoshitaka Tsunekawa, "Localizing Living Body Using Bistatic MIMO Radar in Multi-path Environment", Iwate University, Niigata University, SAMSUNG, 2014 (Year: 2014).*
Shun Hasebe, Dai Sasakawa, Kazuma Kishimoto, and Naoki Honma, "Simultaneous Detection of Multiple Targets Vital Signs Using MIMO Radar", Iwate University, Oct. 23-26, 2018 (Year: 2018).*
Keita Konno, N. Honma, Dai Sasakawa, K. Nishimori, N. Takemura, T. Mitsui, Y. Tsunekawa, "Estimating Living-Body Location Using Bistatic MIMO Radar in Multi-Path Environment", Iwate Unversity, Niigata University, Nippon Institute of Technology, Samsung R&D, 2015 (Year: 2015).*
Yang Miao, Emmeric Tanghe, Jun-ichi Takada, Troels Pedersen, Pierre Laly, Luc Martens and Wout Joseph, "Measurement-Based Feasibility Exploration on Detecting and Localizing Multiple Humans Using MIMO Radio Channel Properties", IEEE Access, Jan. 2020 (Year: 2020).*
Takashi Miwa, Yasuto Kigure, Yoshiki Yamakoshi, "Localization of living-bodies using single-frequency MIMO radar system", Gunma University, Proceedings of ISAP2007, Niigata, Japan (Year: 2007).*
Tianbo Gu, Zheng Fang, Zhicheng Yang, Pengfei Hu, and Prasant Mohapatra, "mmSense: Multi-Person Detection and Identification via mmWave Sensing", University of California, 2019 Association for Computing Machinery (Year: 2019).*
Hayashi, "Direction-Of-Arrival Estimation of Narrowband", IEICE Fundamentals Review, vol. 8, No. 3, 2012, pp. 143-150.
Honma et al., "Performance Evaluation of Living-Body Localization Method Using Compressive Sensing", Proceedings of the 2016 IEICE General Conference, 2016.

* cited by examiner

FIG. 3

$$R = \begin{bmatrix} R_{11} & R_{12} & R_{13} & \cdots \\ R_{21} & R_{22} & R_{23} & \cdots \\ R_{31} & R_{32} & \ddots & \square \\ \vdots & \vdots & \square & \square \end{bmatrix}$$

$$R = \begin{bmatrix} R_{11} & R_{12} & R_{13} & \cdots \\ R_{21} & R_{22} & R_{23} & \cdots \\ R_{31} & R_{32} & \ddots & \square \\ \vdots & \vdots & \square & \square \end{bmatrix}$$

1002

ESTIMATING METHOD AND ESTIMATING DEVICE

CROSS REFERENCE TO RELATED APPLICATIONS

This application claims the benefit of priority of Japanese Patent Applications Number 2018-248250 filed on Dec. 28, 2018 and Number 2019-144735 filed on Aug. 6, 2019, the entire contents of which are hereby incorporated by reference.

BACKGROUND

1. Technical Field

The present disclosure relates to an estimating method and an estimating device for estimating the number of living bodies and the position(s) thereof in a target space, using radio signals.

2. Description of the Related Art

Patent Literature (PTL) 1 (Japanese Unexamined Patent Application Publication No. 2009-281775), PTL 2 (Japanese Unexamined Patent Application Publication No. 2000-171550), and Non-Patent Literature (NPL) 1 (Kazunori Hayashi, "Direction-of-Arrival Estimation of Narrowband Waves", IEICE Fundamentals Review, Vol. 8 No. 3, 2012) disclose technology of detecting a subject using radio signals. PTL 1 discloses technology of obtaining an autocorrelation matrix of a received signal, and the number of targets from the magnitude of an eigenvalue of the autocorrelation matrix. PTL 2 discloses technology of performing eigenvalue decomposition on a correlation matrix of a received signal and counting the number of eigenvalues greater than or equal to a threshold, to obtain the number of targets. NPL 1 discloses technology of estimating the number of subjects that emit radio waves and the position(s) thereof, using compressed sensing. Furthermore, NPL 2 (Naoki Honma, Kentaro Nishimori, and Yoshitaka Tsunekawa, "Evaluation of Living-body Localization Method Using Compressive Sensing", Institute of Electronics, Information and Communication Engineers General Conference 2016) discloses technology of estimating the position of a living body using compressed sensing.

SUMMARY

However, the number of living bodies cannot be estimated with the above conventional technologies.

The present disclosure has been conceived in view of the above circumstances, and provides an estimating method and the estimating device that allow the number of living bodies present in a target region and the position(s) thereof to be accurately estimated using radio signals.

In order to provide such an estimating method, an estimating method according to an aspect of the present disclosure is an estimating method for an estimating device that includes an antenna, the antenna including M transmission antenna elements and N reception antenna elements, where M and N are each a natural number of two or more, the estimating method including: transmitting transmission signals to a target region using the M transmission antenna elements; receiving, by the N reception antenna elements, reception signals that include one or more reflection signals resulting from one or more of the transmission signals transmitted from the M transmission antenna elements being reflected by at least one living body; calculating, from the reception signals received by the N reception antenna elements during a predetermined period, an M×N complex transfer function matrix that includes complex transfer functions as components, the complex transfer functions indicating characteristics of propagation between the M transmission antenna elements and the N reception antenna elements; extracting, using the M×N complex transfer function matrix, K living-body component complex transfer function matrices belonging to a predetermined frequency range and corresponding to different frequencies by a predetermined method, where K is a natural number of two or more, the K living-body component complex transfer function matrices corresponding to components affected by vital activity that includes at least one of respiration, heartbeat, or motion of the at least one living body; generating K living-body component complex transfer function vectors by rearranging each of the K living-body component complex transfer function matrices into a vector; calculating a correlation matrix of the K living-body component complex transfer function vectors for a frequency direction; calculating a correlation matrix vector by rearranging the correlation matrix into a vector; calculating a steering vector constituted by components corresponding to positions of a plurality of regions that are obtained by being divided from the target region; calculating an extended steering vector by changing a dimension of the steering vector to a dimension that is identical to a dimension of the correlation matrix vector; estimating a living-body signal intensity vector by performing compressed sensing for an unknown value that is the living-body signal intensity vector using the correlation matrix vector and the extended steering vector, the living-body signal intensity vector being included in the correlation matrix vector, and corresponding to an intensity of a signal from the at least one living body located in at least one region among the plurality of regions; and estimating, among a plurality of components constituting the living-body signal intensity vector, a total number of one or more components each having a value greater than or equal to a predetermined threshold to be a total number of the at least one living body, and one or more positions of one or more regions corresponding to the one or more components among the plurality of regions to be one or more estimated positions of the at least one living body.

The estimating method and the estimating device according to the present disclosure allow the number of living bodies present in a target region and the position(s) thereof to be accurately estimated using radio signals.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 conceptually illustrates an example of operation of a correlation matrix vector calculator illustrated in FIG. 1;

FIG. 4 conceptually illustrates an example of operation of the correlation matrix vector calculator illustrated in FIG. 1;

DETAILED DESCRIPTION OF THE EMBODIMENTS

Figure 1:
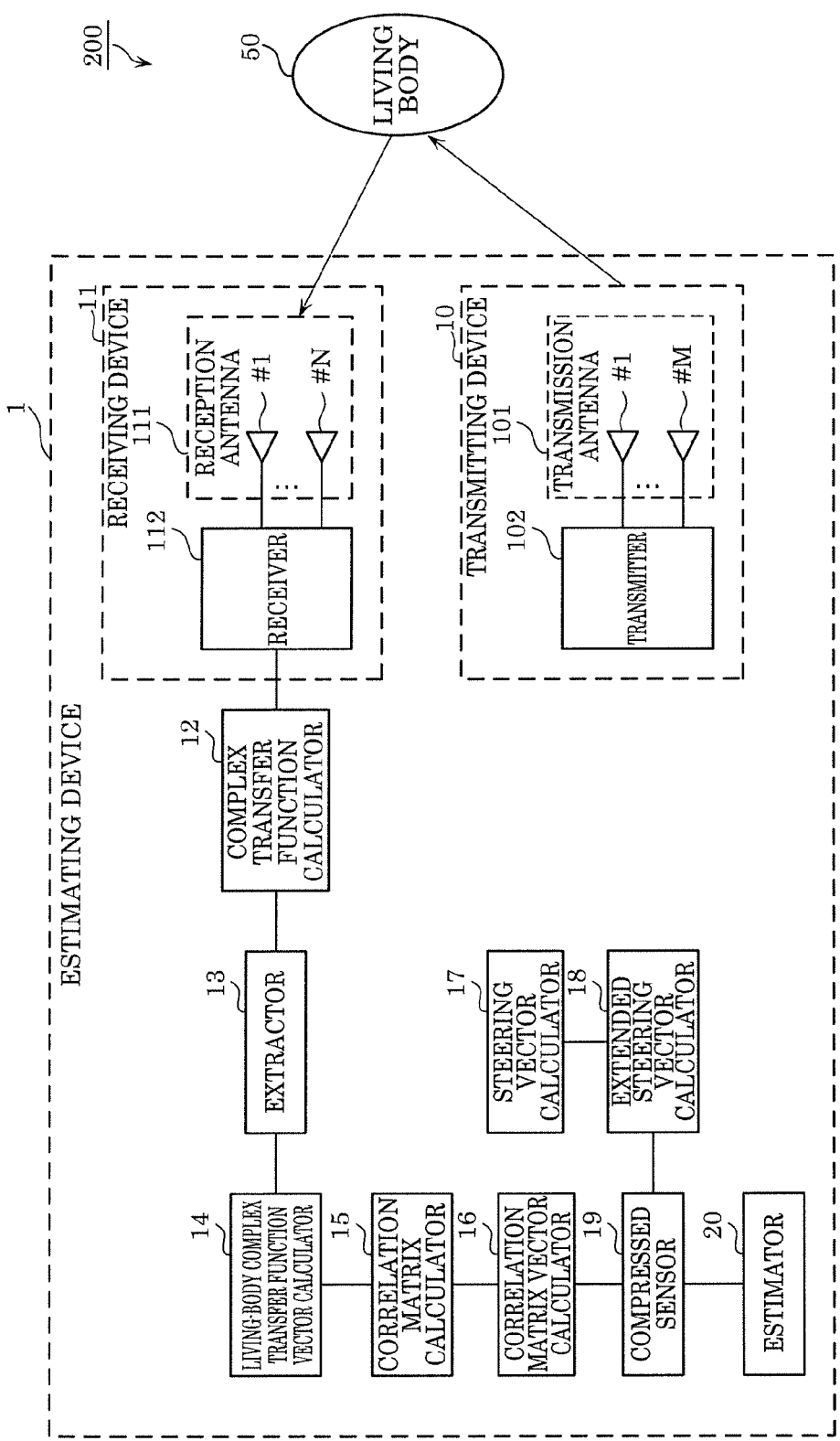
FIG. 1 is a block diagram illustrating an example of a configuration of an estimating device according to an embodiment.

Underlying Knowledge Forming Basis of the Present Disclosure

A method of using radio signals is examined as a method for learning the number of people and the position(s) thereof. The inventors have thoroughly examined conventional technology on estimation of a position of a living body using radio signals.

The result of the examination showed that the methods disclosed in PTL 1, PTL 2, and NPL 1 allow estimation of the number of devices that emit radio waves, but do not allow detection of living bodies, and thus the number of living bodies present in a target region cannot be estimated. That is because, waves reflected by a living body need to be detected in order to estimate the number of living bodies, but even if such conventional technology is used, reflected waves from a living body are extremely weaker than direct waves and waves reflected by a wall, and thus are buried in noise.

The method according to NPL 2 has problems that only a living body that oscillates at a certain single frequency that is, for example, a specific frequency such as 1 Hz can be detected, and thus if an oscillation pattern of a living body changes to a frequency such as 1.1 Hz that is different from the specific frequency, the position of the living body whose oscillation pattern has the changed frequency cannot be estimated. The method according to NPL 1 has a problem that the number of living bodies cannot be estimated.

As a result of repeated studies on the above problems, the inventors have found that estimation of the number of living bodies and the position(s) thereof, which can identify only living bodies and is robust against a variable frequency of a living body, can be conducted by decomposing a received signal for each frequency, excluding 0-Hz components corresponding to a direct wave and a wave reflected by a wall, calculating a correlation matrix for a frequency direction, and performing compressed sensing, thus achieving the present disclosure.

An estimating method according to an aspect of the present disclosure is an estimating method for an estimating device that includes an antenna, the antenna including M transmission antenna elements and N reception antenna elements, where M and N are each a natural number of two or more, the estimating method including: transmitting transmission signals to a target region using the M transmission antenna elements; receiving, by the N reception antenna elements, reception signals that include one or more reflection signals resulting from one or more of the transmission signals transmitted from the M transmission antenna elements being reflected by at least one living body; calculating, from the reception signals received by the N reception antenna elements during a predetermined period, an M×N complex transfer function matrix that includes complex transfer functions as components, the complex transfer functions indicating characteristics of propagation between the M transmission antenna elements and the N reception antenna elements; extracting, using the M×N complex transfer function matrix, K living-body component complex transfer function matrices belonging to a predetermined frequency range and corresponding to different frequencies by a predetermined method, where K is a natural number of two or more, the K living-body component complex transfer function matrices corresponding to components affected by vital activity that includes at least one of respiration, heartbeat, or motion of the at least one living body; generating K living-body component complex transfer function vectors by rearranging each of the K living-body component complex transfer function matrices into a vector; calculating a correlation matrix of the K living-body component complex transfer function vectors for a frequency direction; calculating a correlation matrix vector by rearranging the correlation matrix into a vector; calculating a steering vector constituted by components corresponding to positions of a plurality of regions that are obtained by being divided from the target region; calculating an extended steering vector by changing a dimension of the steering vector to a dimension that is identical to a dimension of the correlation matrix vector; estimating a living-body signal intensity vector by performing compressed sensing for an unknown value that is the living-body signal intensity vector using the correlation matrix vector and the extended steering vector, the living-body signal intensity vector being included in the correlation matrix vector, and corresponding to an intensity of a signal from the at least one living body located in at least one region among the plurality of regions; and estimating, among a plurality of components constituting the living-body signal intensity vector, a total number of one or more components each having a value greater than or equal to a predetermined threshold to be a total number of the at least one living body, and one or more positions of one or more regions corresponding to the one or more components among the plurality of regions to be one or more estimated positions of the at least one living body.

Accordingly, the number of living bodies present in the target region, and the position(s) thereof can be accurately estimated using radio signals. More specifically, components changed due to the influence of a living body are extracted from complex transfer functions indicating characteristics of propagation between the M transmission antenna elements and the N reception antenna elements, and a correlation matrix is calculated from the changed components extracted. Both the number of living bodies and the position(s) thereof can be estimated using the result obtained by applying compressed sensing using the calculated correlation matrix and the steering vector for a plurality of regions.

In extracting the K living-body component complex transfer function matrices, the K living-body component complex transfer function matrices corresponding to the components affected by the vital activity that includes at least one of respiration, heartbeat, or motion of the at least one living body may be extracted by: calculating absolute values of frequency responses of the M×N complex transfer function matrix, the frequency responses being included in a predetermined frequency range; and extracting one or more of the frequency responses each having one of the absolute values that is greater than or equal to a predetermined threshold.

Accordingly, the living-body component complex transfer function matrices corresponding to components affected by vital activity can be extracted, and thus the number of living bodies and the position(s) thereof can be accurately estimated.

In transmitting the transmission signals, a multi-carrier signal into which L subcarrier signals are modulated may be output to each of the M transmission antenna elements, to cause the M transmission antenna elements to transmit a plurality of the multi-carrier signals as the transmission signals, where L is a natural number of two or more, the reception signals received by the N reception antenna elements may include one or more reflection signals resulting from one or more of the plurality of multi-carrier signals being reflected by the at least one living body, the M×N complex transfer function matrix that includes, as components, the complex transfer functions indicating characteristics of propagation between the M transmission antenna elements and the N reception antenna elements may be calculated for each of L subcarriers corresponding to the L subcarrier signals, from the reception signals received by the N reception antenna elements during the predetermined period, to obtain L M×N complex transfer function matrices, and in extracting the K living-body component complex transfer function matrices, the L M×N complex transfer function matrices may be used to extract the K living-body component complex transfer function matrices by the predetermined method, where K is a natural number of two or more, the K living-body component complex transfer function matrices belonging to the predetermined frequency range and corresponding to different frequencies.

With this configuration, multi-carrier signals are used as transmission signals, and thus the number of living bodies and the position(s) thereof can be estimated by using an existing communication device.

The estimating device estimates the number of living bodies and the position(s) thereof by using complex transfer function matrices obtained for subcarriers. Accordingly, the number of living bodies and the position(s) thereof can be estimated more accurately than the case where a single subcarrier is used.

An estimating device according to an aspect of the present disclosure includes: a transmission antenna that includes M transmission antenna elements, where M is a natural number of two or more; a reception antenna that includes N reception antenna elements, where N is a natural number of two or more; a transmitter that transmits transmission signals to a target region using the M transmission antenna elements; a receiver that receives, using the N reception antenna elements, reception signals that include one or more reflection signals resulting from one or more of the transmission signals transmitted from the M transmission antenna elements being reflected by at least one living body; a complex transfer function calculator that calculates, from the reception signals received by the N reception antenna elements during a predetermined period, an M×N complex transfer function matrix that includes complex transfer functions as components, the complex transfer functions indicating characteristics of propagation between the M transmission antenna elements and the N reception antenna elements; an extractor that extracts, using the M×N complex transfer function matrix, K living-body component complex transfer function matrices belonging to a predetermined frequency range and corresponding to different frequencies by a predetermined method, where K is a natural number of two or more, the K living-body component complex transfer function matrices corresponding to components affected by vital activity that includes at least one of respiration, heartbeat, or motion of the at least one living body; a living-body component complex transfer function vector calculator that generates K living-body component complex transfer function vectors by rearranging each of the K living-body component complex transfer function matrices into a vector; a correlation matrix calculator that calculates a correlation matrix of the K living-body component complex transfer function vectors for a frequency direction; a correlation matrix vector calculator that calculates a correlation matrix vector by rearranging the correlation matrix into a vector; a steering vector calculator that calculates a steering vector constituted by components corresponding to positions of a plurality of regions that are obtained by being divided from the target region; an extended steering vector calculator that calculates an extended steering vector by changing a dimension of the steering vector to a dimension that is identical to a dimension of the correlation matrix vector; a compressed sensor that estimates a living-body signal intensity vector by performing compressed sensing for an unknown value that is the living-body signal intensity vector using the correlation matrix vector and the extended steering vector, the living-body signal intensity vector being included in the correlation matrix vector, and corresponding to an intensity of a signal from the at least one living body located in at least one region among the plurality of regions; and an estimator that estimates, among a plurality of components constituting the living-body signal intensity vector, a total number of one or more components each having a value greater than or equal to a predetermined threshold to be a total number of the at least one living body, and one or more positions of one or more regions corresponding to the one or more components among the plurality of regions to be one or more estimated positions of the at least one living body.

Accordingly, the number of living bodies present in the target region, and the position(s) thereof can be accurately estimated using radio signals. More specifically, components changed due to the influence of a living body are extracted from complex transfer functions indicating characteristics of propagation between the M transmission antenna elements and the N reception antenna elements, and a correlation matrix is calculated from the changed components extracted. Both the number of living bodies and the position(s) thereof can be estimated using the result obtained by applying compressed sensing using the calculated correlation matrix and the steering vector for the plurality of regions.

Note that the present disclosure can be implemented not only as a device, but also as an integrated circuit that includes processing elements included in such a device, a method in which such processing elements included in the device are used as steps, a program that causes a computer to perform such steps, or as information, data, or a signal that indicates such a program. Such a program, information, data, and a signal may be distributed through communication media such as the Internet or a recording media such as a CD-ROM.

The following describes in detail the embodiments of the present disclosure with reference to the drawings. Note that the embodiments described in the following each indicate a particular example of the present disclosure. The numerical values, shapes, materials, elements, the arrangement and connection of the elements, steps, the processing order of the steps, and the like described in the following embodiments are mere examples, and thus are not intended to limit the present disclosure. Further, among the elements in the following embodiments, elements not recited in any of the independent claims defining the most generic part of the present disclosure are described as arbitrary elements included in another exemplary embodiment. Note that in the Specification and the Drawings, the same numerals are given to elements having substantially the same functional configuration, and thus a redundant description is omitted.

Embodiment

The following describes, with reference to the drawings, a method of detecting a correlation matrix of received signals using a transmitter and a receiver having the multiple input multiple output (MIMO) configuration, and estimating the number of living bodies present in a target region and the position(s) thereof by a predetermined method.

Configuration of Estimating Device 1

FIG. 1 is a block diagram illustrating an example of a configuration of estimating device 1 according to an embodiment. FIG. 1 also illustrates a living body that is to be measured by estimating device 1 illustrated in FIG. 1.

Estimating device 1 according to the embodiment estimates the number of zero or more living bodies present in target region 1010 and the position(s) thereof, using transmitting device 10 that includes M transmission antenna elements (M is a natural number of two or more) and receiving device 11 that includes N reception antenna elements (N is two or more natural numbers).

As illustrated in FIG. 1, estimating device 1 according to the embodiment includes transmitting device 10, receiving device 11, complex transfer function calculator 12, extractor 13, living-body complex transfer function vector calculator 14, correlation matrix calculator 15, correlation matrix vector calculator 16, steering vector calculator 17, extended steering vector calculator 18, compressed sensor 19, and estimator 20. The following describes details of the elements.

Transmitting Device 10

Transmitting device 10 includes transmission antenna 101 and transmitter 102.

Transmission antenna 101 includes M transmission antenna elements (M is a natural number of two or more) from #1 to #M. Transmission antenna 101 includes an array antenna that includes M elements. Transmission antenna 101 transmits high-frequency signals generated by transmitter 102.

Transmitter 102 generates a high-frequency signal used to estimate presence/absence of one or more living bodies 50, the position(s) thereof, and/or the number thereof. Transmitter 102 transmits, to target region 1010, transmission signal $x=[x_1, \ldots x_N]^T$ representing generated signals, using the M transmission antenna elements included in transmission antenna 101. Operator T denotes the transpose of a matrix, here. For example, transmitter 102 generates a continuous wave (CW) and transmits generated CWs as transmission waves from transmission antenna 101. For example, transmitter 102 transmits a 2.45-GHz sine wave signal. Note that transmitter 102 may generate a modulated signal (modulated wave signal), and may transmit the generated signal, rather than limiting the signal to a sine wave signal such as a CW. Transmitter 102 may generate a signal having a frequency different from the above, and may transmit the generated signal.

Receiving Device 11

Receiving device 11 includes reception antenna 111 and receiver 112.

Reception antenna 111 includes N reception antenna elements (N is a natural number of two or more) from #1 to #N. Reception antenna 111 includes an array antenna having N elements. Reception antenna 111 receives high-frequency signals using the N reception antenna elements. Specifically, each of the N reception antenna elements included in reception antenna 111 receives reception signal $y=[y_1, \ldots y_M]^T$ transmitted from the M transmission antenna elements, and including one or more signals reflected by living body 50 if living body 50 is present. Operator T denotes the transpose of a matrix also here.

Receiver 112 observes, for a predetermined period, reception signals received by the N reception antenna elements and including one or more reflection signals resulting from one or more of the transmission signals transmitted by the M transmission antenna elements being reflected by the living body. The predetermined period corresponds to, for example, a cycle that depends on activity (vital activity) of living body 50, and a living-body dependent cycle of at least one of respiration, heartbeat, or motion of living body 50 (living-body dependent changed period). Receiver 112 converts high-frequency signals received by the N reception antenna elements during the predetermined period, into processable low-frequency signals using a down converter, for example. Receiver 112 transmits the converted low-frequency signals to complex transfer function calculator 12.

Note that in FIG. 1, transmitting device 10 and receiving device 11 are disposed adjacently, but the present embodiment is not limited thereto, and transmitting device 10 and receiving device 11 may be disposed in distant positions.

In FIG. 1, transmission antenna 101 that transmitting device 10 uses and reception antenna 111 that receiving device 11 uses are disposed in different positions as being different antennas, but the present embodiment is not limited thereto. One of transmission antenna 101 that transmitting device 10 uses and reception antenna 111 that receiving device 11 uses may serve as both transmission antenna 101 and reception antenna 111. Furthermore, transmitting device 10 and receiving device 11 may also serve as a Wi-Fi (registered trademark) router or wireless hardware such as a wireless slave machine.

Complex Transfer Function Calculator 12

Complex transfer function calculator 12 calculates, from reception signals received by the N reception antenna elements during the predetermined period, an M×N complex transfer function matrix that includes, as components, complex transfer functions indicating characteristics of propagation between the M transmission antenna elements and the N reception antenna elements. Specifically, for each of M×N combinations that are all the possible combinations as a result of combining the M transmission antenna elements and the N reception antenna elements one-to-one, complex transfer function calculator 12 calculates, using reception signals observed by receiving device 11 during the predetermined period, a complex transfer function indicating characteristics of propagation between the transmission antenna element and the reception antenna element in the combination, thus calculating an M×N complex transfer function matrix. In the present embodiment, complex transfer function calculator 12 calculates complex transfer functions indicating characteristics of propagation between the M transmission antenna elements and the N reception antenna elements, from low-frequency signals transmitted by receiving device 11.

Figure 2:
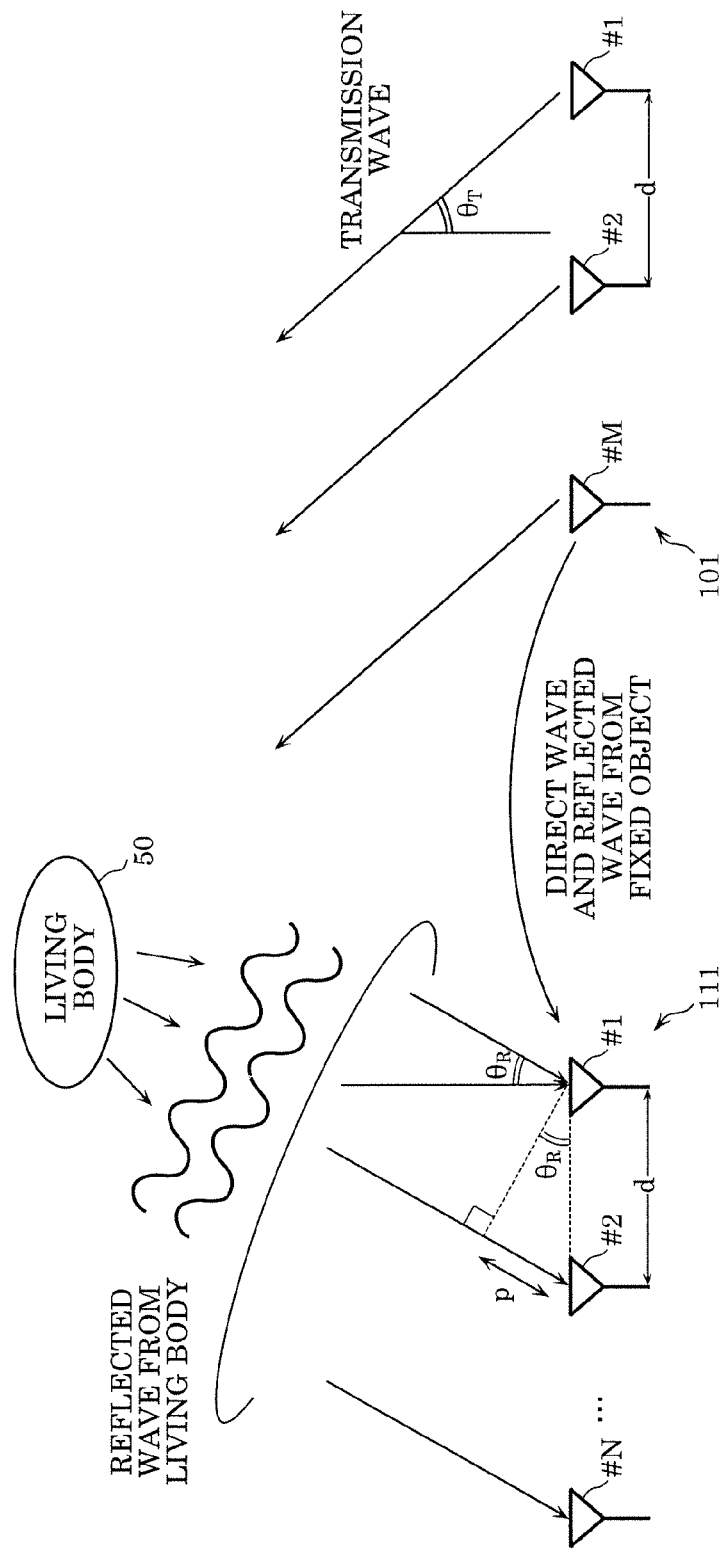
FIG. 2 conceptually illustrates a state in which signal waves are transmitted in the estimating device illustrated in FIG. 1.

FIG. 2 conceptually illustrates a state in which signal waves are transmitted in estimating device 1 illustrated in FIG. 1. As illustrated in FIG. 2, one or more of the transmission waves transmitted from the transmission antenna elements of transmission antenna 101 are reflected by living body 50 and reach the reception antenna elements of reception antenna 111. Here, reception antenna 111 is a reception array antenna that includes the N reception antenna elements, and is a linear array in which the elements are disposed at intervals d. The orientation of living body 50 seen from the front of reception antenna 111 is θ. Living body 50 and reception antenna 111 are sufficiently distant from each other, and a reflected wave from the living body that arrives at reception antenna 111 can be considered as a plane wave.

Complex transfer function calculator 12 can calculate, from complex reception signal vectors observed using the N reception antenna elements, complex transfer function matrix H indicating characteristics of propagation between the M transmission antenna elements and the N reception antenna elements.

Here, a relation between complex transfer function matrix H, transmission signal x, and reception signal y are represented by Expressions 1 and 2 as below.

[Math. 1]

$$y = Hx \quad \text{(Expression 1)}$$

[Math. 2]

$$\begin{bmatrix} y_1 \\ \vdots \\ y_M \end{bmatrix} = \begin{bmatrix} h_{11} & \cdots & h_{1N} \\ \vdots & \ddots & \vdots \\ h_{M1} & \cdots & h_{MN} \end{bmatrix} \begin{bmatrix} x_1 \\ \vdots \\ x_N \end{bmatrix} \quad \text{(Expression 2)}$$

Accordingly, the complex transfer functions calculated by complex transfer function calculator 12 may include reflected waves and/or scattered waves as a result of one or more of the transmission waves transmitted from transmission antenna 101 being reflected/scattered by living body 50. The complex transfer functions calculated by complex transfer function calculator 12 include reflected waves reaching not via living body 50 such as direct waves from transmission antenna 101 and reflected waves from a fixed object. An amplitude and a phase of a signal reflected or scattered by living body 50, that is, a reflected or scattered wave that has reached via living body 50 change at all times due to biological activity of living body 50 such as respiration and heartbeat. The following gives a description, on the assumption that complex transfer functions calculated by complex transfer function calculator 12 include a reflected wave or a scattered wave that is a signal reflected or scattered by living body 50.

Extractor 13

Extractor 13 extracts, using a complex transfer function matrix calculated by complex transfer function calculator 12, K living-body component complex transfer function matrices (K is a natural number of two or more) belonging to a predetermined frequency range and corresponding to different frequencies, by a predetermined method. For example, as the predetermined method, extractor 13 may extract K living-body component complex transfer function matrices by: calculating the absolute values of frequency responses of elements of the complex transfer function matrix calculated by complex transfer function calculator 12, which are included in a predetermined frequency range; and extracting one or more of the frequency responses each having one of the absolute values that is greater than or equal to a predetermined threshold. Accordingly, extractor 13 extracts K living-body component complex transfer function matrices corresponding to components affected by vital activity that includes at least one of respiration, heartbeat, or motion of a living body.

Specifically, extractor 13 chronologically and successively records complex transfer functions that constitute the complex transfer function matrix calculated by complex transfer function calculator 12. Extractor 13 extracts living-body component complex transfer function matrices each expressed by an M×N matrix by extracting, from changes of the complex transfer functions chronologically and successively recorded, components changed due to the influence of a living body. For example, extractor 13 calculates complex transfer function matrices for different frequencies by performing transform into a frequency domain such as, for example, Fourier transform on the changes of the complex transfer functions calculated in complex transfer function calculator 12, and successively and chronologically recorded. Extractor 13 extracts K complex transfer function matrices corresponding to frequencies of oscillation of living body 50 caused by activity of living body 50 from the complex transfer function matrices, as the K living-body component complex transfer function matrices.

Here, as a method of extracting living-body component complex transfer function matrices, a method of calculating a difference between complex transfer functions obtained at two different times, for instance, can be used, other than a method of extracting only components corresponding to oscillation of a living body after performing transform into a frequency domain such as Fourier transform. By performing such a method, components of complex transfer functions obtained via a fixed object other than living body 50 are excluded, and only components of the complex transfer functions obtained via living body 50 remain. Note that there are a plurality of reception antenna elements, and thus components obtained via living body 50 among components of complex transfer functions corresponding to the reception antenna elements are also a plurality of components. Thus, living-body component complex transfer function matrix F(f) calculated in this manner is represented by Expression 3.

[Math. 3]

$$F(f) = \begin{pmatrix} F_{11}(f) & \cdots & F_{1N}(f) \\ \vdots & \ddots & \vdots \\ F_{M1}(f) & \cdots & F_{MN}(f) \end{pmatrix} \quad \text{(Expression 3)}$$

Note that components $F_{ij}$ of living-body component complex transfer function matrix F(f) are components as a result of extracting changed components from components $h_{ij}$ of complex transfer function matrix H. Living-body component complex transfer function matrix F(f) includes functions of frequencies or difference cycles similar to frequencies, and includes corresponding information for the frequencies.

Living-Body Complex Transfer Function Vector Calculator 14

Living-body complex transfer function vector calculator 14 generates K living body complex transfer function vectors by rearranging each of the K living-body component complex transfer function matrices extracted by extractor 13 into a vector. Specifically, living-body complex transfer function vector calculator 14 transforms each of the K living-body component complex transfer function matrices each constituted by M rows and N columns into living-body component complex transfer function vectors $F_{vec}(f)$ represented by vectors of M×N rows and one column, by rearranging the elements of the living-body component complex transfer function matrices. This operation is represented by operator vec. Elements can be arranged by, for example, the method as indicated by Expression 4, yet the order of calculation is not limited as long as operation of rearranging a matrix is performed.

[Math. 4]

$$F_{vec}(f) = vec[F(f)] = \\ [F_{11}(f) \ldots F_{M1}(f) F_{12}(f) \ldots F_{M2}(f) \ldots F_{1N}(f) \ldots F_{MN}(f)]^T$$ (Expression 4)

Correlation Matrix Calculator 15

Correlation matrix calculator 15 calculates a correlation matrix of K living-body component complex transfer function vectors generated by living-body complex transfer function vector calculator 14 for a frequency direction. More specifically, correlation matrix calculator 15 calculates correlation matrix R of living-body component complex transfer function vectors constituted by components changed due to living body 50, according to Expression 5. Correlation matrix R is constituted by an M×N rows and M×N columns.

[Math. 5]

$$R = E[F_{vec}(f) F_{vec}(f)^H]$$ (Expression 5)

Here, E[•] in Expression 5 denotes an ensemble average, and operator H denotes complex conjugate transpose. Specifically, correlation matrix calculator 15 calculates correlation matrix R averaged in the frequency direction, using K living-body component complex transfer function vectors for frequency components in the calculation of a correlation matrix. This allows sensing performed using simultaneously components at the frequencies. Specifically, even when a component having a specific frequency such as, for example, a 1-Hz component is weak, sensing is possible using a component at a frequency close to the specific frequency such as, for example, a component at 0.9 Hz or 1.1 Hz. Note that in order to use only a frequency at which a living body component is large, in the averaging operation represented by Expression 5, only frequencies at which a total or a maximum value of the absolute values of components of $F_{vec}(f)$ is greater than or equal to a certain value may be selected.

Correlation Matrix Vector Calculator 16

Correlation matrix vector calculator 16 calculates a correlation matrix vector by rearranging correlation matrix R calculated by correlation matrix calculator 15 into a vector. Specifically, correlation matrix vector calculator 16 rearranges the components of correlation matrix R constituted by M×N rows and M×N columns, to transform correlation matrix R into correlation matrix vector $R_{vec}$ having $M^2 \times N^2$ rows and one column. Expression 4 may be used for such transform, similarly to vectorization by living-body complex transfer function vector calculator 14.

Correlation matrix vector calculator 16 may calculate correlation matrix vector $R_{vec}$, using some of the components of correlation matrix R to reduce the amount of calculation and an area for storage. For example, correlation matrix vector calculator 16 may calculate correlation matrix vector $R_{vec}$ using only the portion of inverted-L-shaped region 1001 illustrated in FIG. 3 or only the portion of lower left triangular region 1002 illustrated in FIG. 4, out of correlation matrix R. Accordingly, correlation matrix vector $R_{vec}$ can be calculated by extracting components having particularly large feature quantities, and thus the amount of calculation and an area for storage can be effectively reduced while avoiding reduction in accuracy of estimation results.

Steering Vector Calculator 17

Steering vector calculator 17 divides target region 1010 for estimating device 1 into $N_{grid}$ regions 1011-1 to 1011-$N_{grid}$. Next, steering vector calculator 17 calculates, for each of regions 1011-1 to 1011-$N_{grid}$ into which target region 1010 is divided, angles $\theta_{ti}$ and $\theta_{ri}$ between a reference line and two straight lines obtained by connecting a representative point in the region and each of the position of transmission antenna 101 and the position of reception antenna 111. Here, i denotes an integer from 1 to $N_{grid}$. The representative point in the region is a point at a center of gravity or an upper right corner of the region, for example. Also, the reference line is a straight line that connects the position of transmission antenna 101 and the position of reception antenna 111, for example. A relation of dividing the region and angles $\theta_{ti}$ and $\theta_{ri}$ to be obtained is illustrated in FIG. 5.

Figure 5:
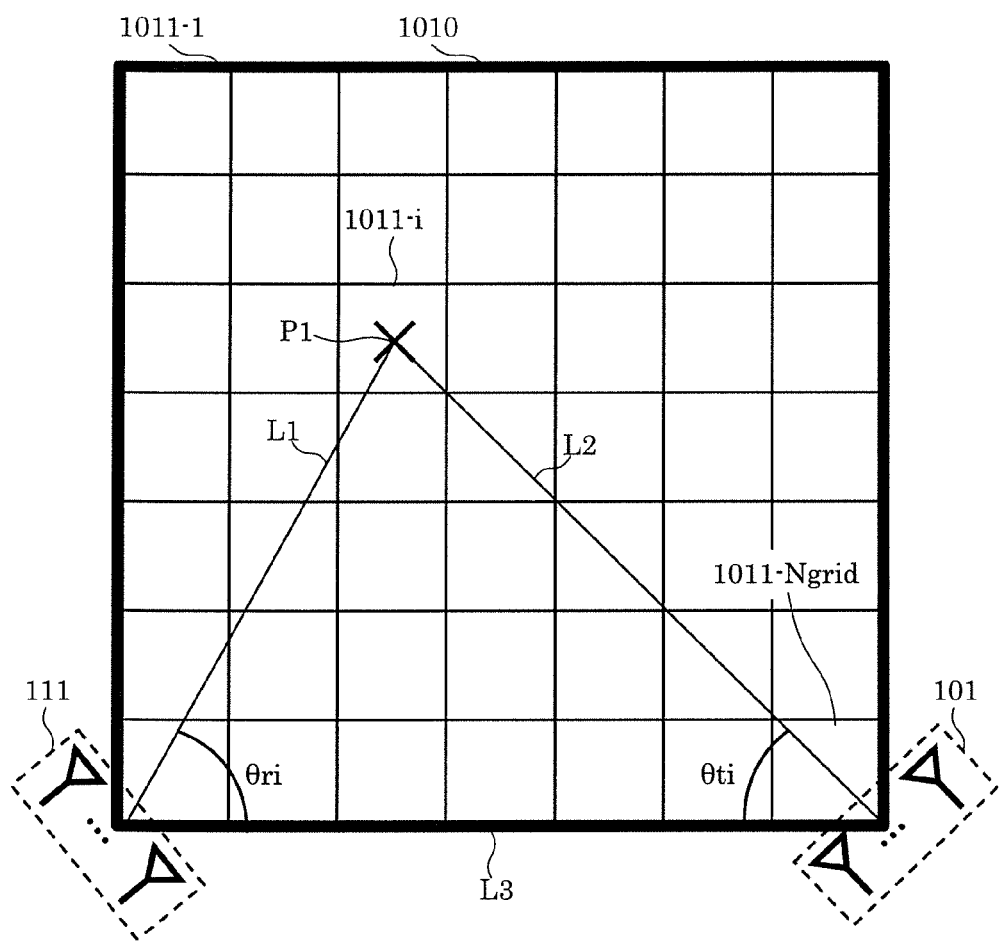
FIG. 5 conceptually illustrates a target region for the estimating device illustrated in FIG. 1.

As illustrated in FIG. 5, angle $\theta_{ti}$ for region 1010-i is an angle between reference line L3 and straight line L2 that connects representative point P1 in region 1010-i and the position of transmission antenna 101. Angle $\theta_{ri}$ for region 1010-i is an angle between reference line L3 and straight line L1 that connects representative point P1 in region 1010-i and the position of reception antenna 111. Representative point P1 in region 1010-i is the center of gravity of region 1010-i, for example.

Next, steering vector calculator 17 calculates steering vector $a_i(\theta_{ti}, \theta_{ri})$ for each of angles $\theta_{ti}$ and $\theta_{ri}$, using Expressions 6, 7, and 8.

[Math. 6]

$$a_i(\theta_t, \theta_r) = a_{ti}(\theta_t) \otimes a_{ri}(\theta_r)$$ (Expression 6)

[Math. 7]

$$a_{ti}(\theta) = \left[1, e^{-i\frac{2\pi}{\lambda}d\sin\theta}, \ldots, e^{-i\frac{2\pi}{\lambda}d(M-1)\sin\theta}\right]$$ (Expression 7)

[Math. 8]

$$a_{ri}(\theta) = \left[1, e^{-i\frac{2\pi}{\lambda}d\sin\theta}, \ldots, e^{-i\frac{2\pi}{\lambda}d(N-1)\sin\theta}\right]$$ (Expression 8)

Here, λ denotes a wavelength of a radio wave transmitted, N denotes the number of antenna elements that constitute an array antenna, j denotes an imaginary unit, e denotes a base of a natural logarithm, and ⊗  [Math. 9]

denotes a Kronecker product.

Accordingly, when target region 1010 is divided into regions 1011-1 to 1011-$N_{grid}$, steering vector calculator 17 calculates steering vector $a_i(\theta_{ti}, \theta_{ri})$ constituted by components corresponding to the positions of regions 1011-1 to 1011-$N_{grid}$.

Extended Steering Vector Calculator 18

Extended steering vector calculator 18 calculates an extended steering vector by changing the dimension of steering vector $a_i(\theta_t, \theta_r)$ calculated by steering vector calculator 17 to a dimension that is identical to the dimension of the correlation matrix vector. Specifically, extended steering vector calculator 18 performs the transform represented by Expressions 9 and 10, and calculates rows of extended steering vector A, and $A_i$.

[Math. 10]

$$A=[A_1\ A_2\ \ldots\ A_{N_{grid}}] \quad \text{(Expression 9)}$$

[Math. 11]

$$A_i=\text{vec}\{\text{vec}[a_i(\theta_t, \theta_r)]\text{vec}[a_i(\theta_t, \theta_r)]^H\} \quad \text{(Expression 10)}$$

Correlation matrix vector $R_{vec}$ can be represented as shown by Expression 11 using extended steering vector A.

[Math. 12]

$$R_{vec}=As=[A_1\ A_2\ \ldots\ A_{N_{grid}}]\begin{bmatrix}s_1\\s_2\\\vdots\\s_{N_{grid}}\end{bmatrix} \quad \text{(Expression 11)}$$

Here, s denotes a living-body signal intensity vector constituted by unknown values that indicate the magnitude of living body components received via regions 1011-1 to 1011-$N_{grid}$.

Note that when correlation matrix vector calculator 16 calculates correlation matrix vector $R_{vec}$ by selecting only a portion of living body correlation matrix R, correlation matrix vector calculator 16 similarly selects only portions of rows of extended steering vector A.

Compressed Sensor 19

Compressed sensor 19 estimates living-body signal intensity vector s by performing compressed sensing for an unknown value that is the living-body signal intensity vector using the correlation matrix vector and the extended steering vector, the living-body signal intensity vector being included in correlation matrix vector $R_{vec}$, and corresponding to an intensity of a signal from a living body located in each of regions 1011-1 to 1011-$N_{grid}$. Expression 11 has a shape of an expression of typical compressed sensing and can be calculated using various compressed sensing algorithms. For example, the HQR method disclosed in NPL 1 may be used, or a fast iterative shrinkage thresholding algorithm (FISTA) or an iterative shrinkage thresholding algorithm (ISTA) may be used.

Estimator 20

Estimator 20 estimates a region in which a living body is present among regions 1011-1 to 1011-$N_{grid}$, from living-body signal intensity vector s that is an unknown value estimated by compressed sensor 19. Specifically, estimator 20 estimates the number of components each having a value greater than or equal to a predetermined threshold as the number of living bodies, among components $s_1$ to $S_{Ngrid}$ of estimated living-body signal intensity vector s. Furthermore, among components $s_1$ to $S_{Ngrid}$ of estimated living-body signal intensity vector s, estimator 20 estimates the position of region 1011-i corresponding to component $s_i$ having a value greater than or equal to the predetermined threshold as an estimated position of a living body. Here, the predetermined threshold may be sufficiently larger than the value of a component of living-body signal intensity vector s corresponding to a region in which no person is present, and for example, may be set to a value that is twice the value of a component of living-body signal intensity vector s measured when no person is present.

Note that compressed sensor 19 may perform compressed sensing using living-body component complex transfer function vectors and steering vector $a_i(\theta_t, \theta_r)$, instead of correlation matrix vector $R_{vec}$ and extended steering vector A. In this case, since the dimension of a matrix used for compressed sensing can be decreased, advantageous effects of reducing the amount of calculation can be expected.

Note that transmitter 102 of transmitting device 10, receiver 112 of receiving device 11, complex transfer function calculator 12, extractor 13, living-body complex transfer function vector calculator 14, correlation matrix calculator 15, correlation matrix vector calculator 16, steering vector calculator 17, extended steering vector calculator 18, compressed sensor 19, and estimator 20 may be implemented by one or more processors executing a program stored in memory included in estimating device 1 or may be implemented by one or more dedicated circuits. Specifically, the above elements may be implemented by software or hardware.

Operation of Estimating Device 1

Next, operation of estimating device 1 having a configuration as described above is to be described with reference to the drawings.

Figure 6:
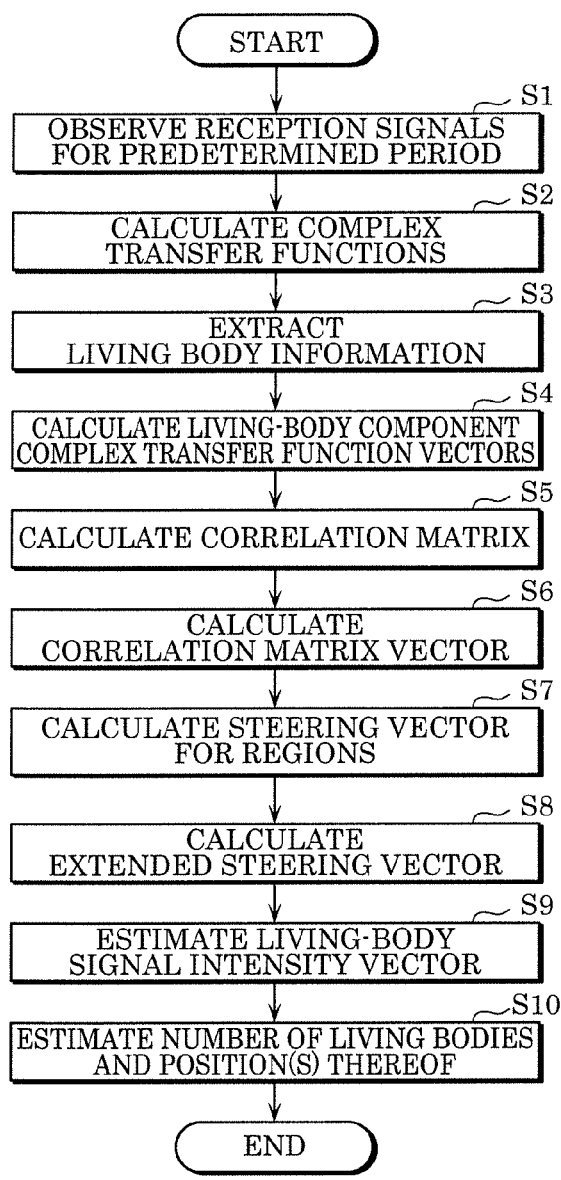
FIG. 6 is a flowchart illustrating estimation processing performed by the estimating device according to the embodiment.

FIG. 6 is a flowchart illustrating estimation processing performed by estimating device 1 according to the embodiment.

First, estimating device 1 transmits a transmission signal to target region 1010, and observes reception signals during a predetermined period (S1). More specifically, estimating device 1 observes, for the predetermined period, reception signals transmitted from M transmission antenna elements and including one or more reflection signals reflected by living body 50 if living body 50 is present.

Next, estimating device 1 calculates complex transfer functions from the reception signals observed in step S1 (S2). More specifically, estimating device 1 calculates, from reception signals received by the N reception antenna elements during the predetermined period, complex transfer functions indicating characteristics of propagation between the M transmission antenna elements and the N reception antenna elements. Details are as described above, and thus a description thereof is omitted here. The same also applies to the following.

Next, estimating device 1 extracts K living-body component complex transfer function matrices that indicate living-body information by extracting components changed due to influence of a living body from the complex transfer functions calculated in step S2 (S3). More specifically, estimating device 1 extracts changed components in the N reception antenna elements, which are components changed due to the influence of a living body, from the complex transfer functions calculated in step S2.

Next, estimating device 1 transforms each of the K living-body component complex transfer function matrices indicating living-body information extracted in step S3 into a vector, thus calculating K living-body component complex transfer function vectors (S4).

Next, estimating device 1 calculates a correlation matrix of the K living-body component complex transfer function vectors calculated in step S4 (S5).

Next, estimating device 1 calculates a correlation matrix vector by transforming the correlation matrix calculated in step S5 into a shape of a vector (S6).

Next, estimating device 1 divides target region 1010 in which the number of living bodies and the position(s) thereof are to be estimated, into regions 1011-1 to 1011-$N_{grid}$, and calculates a steering vector for the regions (S7).

Next, estimating device 1 transforms the steering vector calculated in step S7 into an extended steering vector having a dimension identical to the dimension of the correlation matrix vector calculated in step S6 (S8).

Next, estimating device 1 estimates, using compressed sensing, a living-body signal intensity vector that indicate the intensity of a living-body signal corresponding to the regions divided in step S7, from a correlation matrix vector calculated in step S6 and the extended steering vector calculated in step S8 (S9).

Next, estimating device 1 estimates the number of living bodies and the position(s) thereof from the living-body signal intensity vector estimated in step S9 (S10). More specifically, among the components of the living-body signal intensity vector, estimating device 1 estimates the number of one or more components each having a value greater than or equal to a predetermined threshold to be the number of living bodies, and estimates one or more regions corresponding to the one or more components each having a value greater than or equal to the predetermined threshold to be the position(s) of one or more living bodies. Thus, estimating device 1 can estimate both the number of living bodies and the position(s) thereof, with regard to living bodies present in the target region.

Advantageous Effects and Others

Estimating device 1 according to the embodiment can accurately estimate the number of living bodies present in target region 1010 and the position(s) thereof using radio signals. More specifically, estimating device 1 extracts components changed due to the influence of a living body from complex transfer functions indicating characteristics of propagation between the M transmission antenna elements and the N reception antenna elements, and calculates a correlation matrix from the changed components extracted. Estimating device 1 can estimate both the number of living bodies and the position(s) thereof, using the result obtained by applying compressed sensing using the calculated correlation matrix and the steering vector for the plurality of regions.

Variation

Estimating device 1 according to the above embodiment may use a multi-carrier signal into which a plurality of subcarrier signals are modulated, as a transmission signal. Specifically, transmitter 102 generates a multi-carrier signal by generating a plurality of subcarrier signals corresponding to a plurality of subcarriers in different frequency bands, and multiplexing the generated subcarrier signals. Transmitter 102 generates an orthogonal frequency division multiplexing (OFDM) signal which is constituted by S subcarriers and for which utilization efficiency of frequency bands is high, for example.

Note that transmitter 102 is not limited to generate an OFDM signal in which subcarriers are orthogonal to one another as long as the signal is a multi-carrier signal obtained by multi-carrier modulation, and may generate another multi-carrier signal such as a simple frequency division multiplexing (FDM) signal. Transmitter 102 transmits the generated multi-carrier signal from each of the M transmission antenna elements of transmission antenna 101.

Receiver 112 observes, for a predetermined period corresponding to the cycle of motion of a living body, reception signals received by the N reception antenna elements and including one or more reflection signals as a result of one or more of the multi-carrier signals that are transmitted from the M transmission antenna elements being reflected or scattered by living body 50.

Complex transfer function calculator 12 performs, for each of subcarriers to which subcarrier signals correspond, similar processing to the processing in the embodiment, to calculate complex transfer functions for the subcarrier signals.

Using a matrix of the complex transfer functions calculated by complex transfer function calculator 12, extractor 13 extracts, by a predetermined method, K living-body component complex transfer function matrices (K is a natural number of two or more) belonging to a predetermined frequency range and corresponding to different frequencies.

The subsequent processes are the same as the processes in the embodiment, and thus a detailed description thereof is omitted.

Accordingly, multi-carrier signals such as OFDM signals are used as transmission signals, and thus the number of living bodies and the position(s) thereof can be estimated by using an existing multi-carrier transmitter-receiver. For example, as an existing communication device, OFDM receivers have already been widely used as mobile phones, television broadcasting receivers, and wireless local area network (LAN) devices, for instance, and cost reduction is achieved as compared to the case where non-modulated signals are used.

Estimating device 1 estimates the number of living bodies and the position(s) thereof by using complex transfer function matrices obtained for subcarriers. Accordingly, the number of living bodies and the position(s) thereof can be estimated more accurately than the case where a single subcarrier is used.

Estimating device 1 according to the above embodiment calculates a correlation matrix of K living-body component complex transfer function vectors to combine K data items into one data. Yet the present disclosure is not limited to this, and estimating device 1 may perform various processes for each of the K living-body component complex transfer function vectors and combine obtained K results, to estimate the number of living bodies and the position(s) thereof. Specifically, estimating device 1 in this case estimates K living-body signal intensity vectors by sequentially, for each of the K living-body component complex transfer function vectors, calculating a correlation matrix, calculating a correlation matrix vector, and performing compressed sensing using an extended steering vector, and may estimate, among averages or medians each from components of the estimated K living-body signal intensity vectors at the same position, the number of averages or medians greater than or equal to a predetermined threshold to be the number of living bodies, and furthermore, may estimate the position of a region corresponding to components whose average or median is greater than or equal to the predetermined threshold to be the position of a living body.

Estimating device 1 according to the above embodiment may further perform highly accurate estimation of arrival directions by using the multiple signal classification (MUSIC) method, for instance, using a correlation matrix calculated from the extracted changed components and the estimated number of people. Accordingly, the orientation of a living body present in a target region and the position thereof can be estimated. Thus, the position of a living body present in a target region can be estimated using radio signals.

The position of a living body can also be tracked together with the number thereof, by sequentially performing position estimate processing in the above embodiment. Accordingly, the position of a living body present in a target region can be grasped in real time using radio signals.

The above has described an estimating device and an estimating method according to an aspect of the present disclosure, based on the embodiment, yet the present disclosure is not limited to such embodiments. The scope of the present disclosure also includes various modifications that may be conceived by those skilled in the art made to the present embodiment and aspects achieved by combining elements in different embodiments, without departing from the essence of the present disclosure.

The present disclosure can be implemented not only as an estimating device that includes such distinguishing elements, but also as, for instance, an estimating method that includes, as steps, the distinguishing elements included in the estimating device. The present disclosure can also be implemented as a computer program that causes a computer to execute the distinguishing steps included in such a method. It is needless to say that such a computer program can be distributed through a non-transitory computer-readable recording medium such as CD-ROM or a communication network such as the Internet.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for instance, an estimating method and an estimating device for estimating the number of living bodies using radio signals, and in particular to an estimating method and an estimating device that are used for consumer electronics that perform control according to whether a living body is present or the number of living bodies, and the position(s) thereof, and a monitoring device that detects invasion of a living body.

What is claimed is:

1. An estimating method for an estimating device that includes an antenna, the antenna including M transmission antenna elements and N reception antenna elements, where M and N are each a natural number of two or more, the estimating method comprising:
transmitting transmission signals to a target region using the M transmission antenna elements;
receiving, by the N reception antenna elements, reception signals that include one or more reflection signals resulting from one or more of the transmission signals transmitted from the M transmission antenna elements being reflected by at least one living body;
calculating, from the reception signals received by the N reception antenna elements during a predetermined period, an M×N complex transfer function matrix that includes complex transfer functions as components, the complex transfer functions indicating characteristics of propagation between the M transmission antenna elements and the N reception antenna elements;
extracting, using the M×N complex transfer function matrix, K living-body component complex transfer function matrices belonging to a predetermined frequency range and corresponding to different frequencies by a predetermined method, where K is a natural number of two or more, the K living-body component complex transfer function matrices corresponding to components affected by vital activity that includes at least one of respiration, heartbeat, or motion of the at least one living body;
generating K living-body component complex transfer function vectors by rearranging each of the K living-body component complex transfer function matrices into a vector;
calculating a correlation matrix of the K living-body component complex transfer function vectors for a frequency direction;
calculating a correlation matrix vector by rearranging the correlation matrix into a vector;
calculating a steering vector constituted by components corresponding to positions of a plurality of regions that are obtained by being divided from the target region;
calculating an extended steering vector by changing a dimension of the steering vector to a dimension that is identical to a dimension of the correlation matrix vector;
estimating a living-body signal intensity vector by performing compressed sensing for an unknown value that is the living-body signal intensity vector using the correlation matrix vector and the extended steering vector, the living-body signal intensity vector being included in the correlation matrix vector, and corresponding to an intensity of a signal from the at least one living body located in at least one region among the plurality of regions; and
estimating, among a plurality of components constituting the living-body signal intensity vector, a total number of one or more components each having a value greater than or equal to a predetermined threshold to be a total number of the at least one living body, and one or more positions of one or more regions corresponding to the one or more components among the plurality of regions to be one or more estimated positions of the at least one living body.

2. The estimating method according to claim 1, wherein in extracting the K living-body component complex transfer function matrices, the K living-body component complex transfer function matrices corresponding to the components affected by the vital activity that includes at least one of respiration, heartbeat, or motion of the at least one living body are extracted by:
calculating absolute values of frequency responses of the M×N complex transfer function matrix, the frequency responses being included in a predetermined frequency range; and extracting one or more of the frequency responses each having one of the absolute values that is greater than or equal to a predetermined threshold.

3. The estimating method according to claim 1, wherein in transmitting the transmission signals, a multi-carrier signal into which L subcarrier signals are modulated is output to each of the M transmission antenna elements, to cause the M transmission antenna elements to transmit a plurality of the multi-carrier signals as the transmission signals, where L is a natural number of two or more, the reception signals received by the N reception antenna elements include one or more reflection signals resulting from one or more of the plurality of multi-carrier signals being reflected by the at least one living body, the M×N complex transfer function matrix that includes, as components, the complex transfer functions indicating characteristics of propagation between the M transmission antenna elements and the N reception antenna elements is calculated for each of L subcarriers corresponding to the L subcarrier signals, from the reception signals received by the N reception antenna elements during the predetermined period, to obtain L M×N complex transfer function matrices, and in extracting the K living-body component complex transfer function matrices, the L M×N complex transfer function matrices are used to extract the K living-body component complex transfer function matrices by the predetermined method, where K is a natural number of two or more, the K living-body component complex transfer function matrices belonging to the predetermined frequency range and corresponding to different frequencies.

4. An estimating device, comprising:

a transmission antenna that includes M transmission antenna elements, where M is a natural number of two or more;

a reception antenna that includes N reception antenna elements, where N is a natural number of two or more;

a transmitter that transmits transmission signals to a target region using the M transmission antenna elements;

a receiver that receives, using the N reception antenna elements, reception signals that include one or more reflection signals resulting from one or more of the transmission signals transmitted from the M transmission antenna elements being reflected by at least one living body;

a complex transfer function calculator that calculates, from the reception signals received by the N reception antenna elements during a predetermined period, an M×N complex transfer function matrix that includes complex transfer functions as components, the complex transfer functions indicating characteristics of propagation between the M transmission antenna elements and the N reception antenna elements;

an extractor that extracts, using the M×N complex transfer function matrix, K living-body component complex transfer function matrices belonging to a predetermined frequency range and corresponding to different frequencies by a predetermined method, where K is a natural number of two or more, the K living-body component complex transfer function matrices corresponding to components affected by vital activity that includes at least one of respiration, heartbeat, or motion of the at least one living body;

a living-body component complex transfer function vector calculator that generates K living-body component complex transfer function vectors by rearranging each of the K living-body component complex transfer function matrices into a vector;

a correlation matrix calculator that calculates a correlation matrix of the K living-body component complex transfer function vectors for a frequency direction;

a correlation matrix vector calculator that calculates a correlation matrix vector by rearranging the correlation matrix into a vector;

a steering vector calculator that calculates a steering vector constituted by components corresponding to positions of a plurality of regions that are obtained by being divided from the target region;

an extended steering vector calculator that calculates an extended steering vector by changing a dimension of the steering vector to a dimension that is identical to a dimension of the correlation matrix vector;

a compressed sensor that estimates a living-body signal intensity vector by performing compressed sensing for an unknown value that is the living-body signal intensity vector using the correlation matrix vector and the extended steering vector, the living-body signal intensity vector being included in the correlation matrix vector, and corresponding to an intensity of a signal from the at least one living body located in at least one region among the plurality of regions; and an estimator that estimates, among a plurality of components constituting the living-body signal intensity vector, a total number of one or more components each having a value greater than or equal to a predetermined threshold to be a total number of the at least one living body, and one or more positions of one or more regions corresponding to the one or more components among the plurality of regions to be one or more estimated positions of the at least one living body.

* * * * *